(12) United States Patent
McCarter

(10) Patent No.: US 9,461,448 B1
(45) Date of Patent: Oct. 4, 2016

(54) TOOL FOR REMOVING JACKET MATERIAL FROM TUBING AND CABLE

(71) Applicant: O'Brien Holding Co., Inc., Saint Louis, MO (US)

(72) Inventor: Marcus C. McCarter, Catawissa, MO (US)

(73) Assignee: O'Brien Holding Co., Inc., Saint Louis, MO (US)

( * ) Notice: Subject to any disclaimer, the term of this patent is extended or adjusted under 35 U.S.C. 154(b) by 223 days.

(21) Appl. No.: 14/154,837

(22) Filed: Jan. 14, 2014

Related U.S. Application Data

(60) Provisional application No. 61/753,064, filed on Jan. 16, 2013.

(51) Int. Cl.
*H02G 1/12* (2006.01)

(52) U.S. Cl.
CPC .......... *H02G 1/1229* (2013.01); *H02G 1/1219* (2014.07)

(58) Field of Classification Search
CPC ........................ H02G 1/1219; H02G 1/1229
USPC .......................................................... 30/90.6
See application file for complete search history.

(56) References Cited

U.S. PATENT DOCUMENTS

| | | | | | |
|---|---|---|---|---|---|
| 1,165,176 | A | * | 12/1915 | Hornor ................ | H02G 1/1229 30/90.6 |
| 4,905,373 | A | * | 3/1990 | Krampe ............... | H02G 1/1229 30/90.6 |
| 4,979,299 | A | * | 12/1990 | Bieganski ........... | H02G 1/1224 30/90.1 |
| 5,077,895 | A | * | 1/1992 | Okubo ................ | H02G 1/1229 30/90.6 |
| 5,093,992 | A | * | 3/1992 | Temple, Jr. .......... | G02B 6/4497 30/90.4 |
| 5,140,751 | A | * | 8/1992 | Faust .................. | G02B 6/4497 30/90.4 |
| 6,131,289 | A | * | 10/2000 | Tarpill ................ | H02G 1/1295 30/90.1 |
| 6,427,331 | B1 | * | 8/2002 | Tarpill ................ | H02G 1/1217 30/90.1 |
| 6,510,611 | B2 | * | 1/2003 | Edwards ............. | H02G 1/1229 30/90.1 |
| 6,622,386 | B2 | * | 9/2003 | Miller ................. | H01R 43/28 30/278 |
| 7,694,420 | B2 | * | 4/2010 | Ehret .................. | H02G 1/1224 30/90.1 |
| 7,984,553 | B1 | * | 7/2011 | Miller ................. | H02G 1/1224 30/90.1 |
| 8,393,250 | B2 | * | 3/2013 | Schumacher ........ | H02G 1/1224 30/90.1 |
| 9,099,852 | B2 | * | 8/2015 | Bignon-Zillhardt . | H02G 1/1204 |
| 2015/0089815 | A1 | * | 4/2015 | Woodward .......... | H02G 1/1226 30/90.1 |

* cited by examiner

*Primary Examiner* — Hwei C Payer
(74) *Attorney, Agent, or Firm* — Polster, Lieder, Woodruff & Lucchesi, L.C.

(57) ABSTRACT

A tool for removing a jacket from a tube or cable comprises a first through-hole extending through a body of the tool tangent to an anvil. A cut head pivotably mounted to the body includes a depression and a cutting blade mounted to extend into the depression a distance less than the expected thickness of the jacket. The cut head may be raised, then lowered onto a jacketed tube or cable inserted into the first through-hole. Rotation of the tool or the tube or cable scores the jacket circumferentially. A hook blade extends into a second hole in the body at a non-radial orientation to the hole, the hook blade being positioned to engage an inner surface of the jacket when the jacketed tube is inserted into the second hole, and to cut a longitudinal slit in the jacket from a free end of the jacket to the circumferential score.

16 Claims, 4 Drawing Sheets

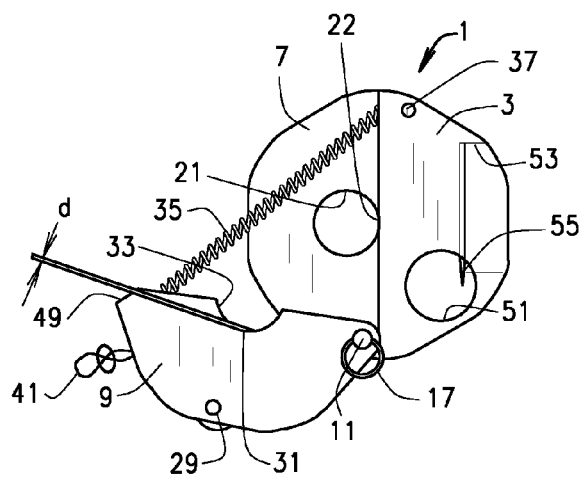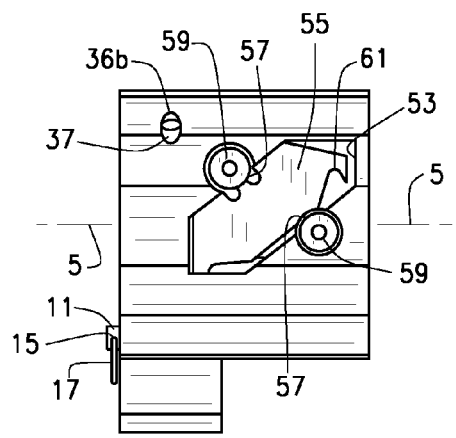
FIG. 1
FIG. 2
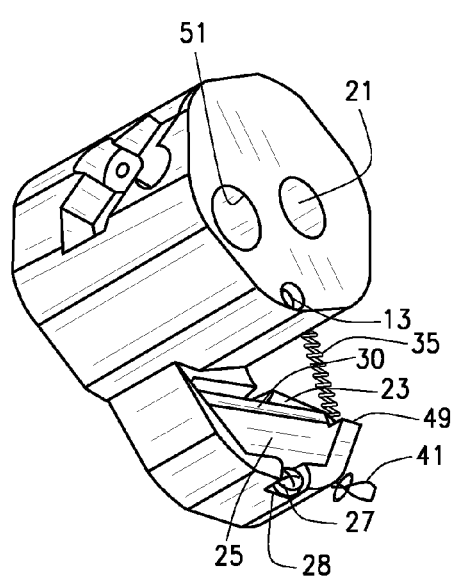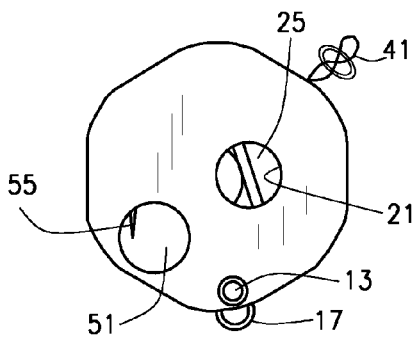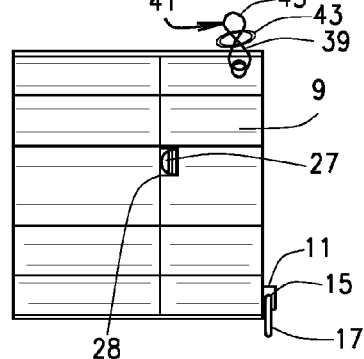
FIG. 3
FIG. 4
FIG. 5

TOOL FOR REMOVING JACKET MATERIAL FROM TUBING AND CABLE

CROSS-REFERENCE TO RELATED APPLICATIONS

This is a United States non-provisional application that claims priority to U.S. Provisional Application 61/753,064, filed Jan. 16, 2013. This application is hereby incorporated by reference.

STATEMENT REGARDING FEDERALLY SPONSORED RESEARCH

Not applicable.

BACKGROUND OF THE INVENTION

This invention relates to tubing and cable jacketed with non-metallic compounds. In the process of removing the jacket from tubing and or cable it is important not to scratch or otherwise damage the surface of the underlying tubing or cable. Currently available tools and methods often scratch or otherwise deface the surface of the tube or cable.

BRIEF SUMMARY OF THE INVENTION

Briefly stated, in accordance with the present invention a tool is provided which produces a measured score or partial cut in the jacket applied to tubing and cable in a circumferential direction. It then lifts the jacket away from the surface of the tube or cable and cuts the jacket longitudinally from an end to the circumferential score previously created. The jacket can then be cleanly removed from the tube or cable.

The tool of the invention shields all cutting surfaces from contact with anything other than the intended jacket. It thereby removes the jacket without damage to the surface of the tube or cable.

A preferred embodiment of the tool of the invention utilizes commonly available replaceable cutting knives. The cutting knives are preferably planar and are mounted for easy access and replacement, while being embedded in the tool deeply enough to avoid any danger of seriously injuring the user.

A preferred embodiment of the tool is compact enough to be held and used with one hand. In an embodiment, a hinge pin of the tool is held in place by a key ring, preferably of the split ring type, thereby allowing the tool to be clipped to a user's belt or lanyard, for example by a carabiner.

Other aspects of the invention will be apparent to those skilled in the art in light of the following description of illustrative embodiments of the invention.

BRIEF DESCRIPTION OF THE SEVERAL VIEWS OF THE DRAWINGS

In the accompanying drawings which form part of the specification:

FIG. 1 is a view in front elevation of one embodiment of tool of the present invention, a cut head portion of the tool being opened excessively far in order to show the tool more clearly.

FIG. 2 is a view in right side elevation of the tool of FIG. 1.

FIG. 3 is a view in rear perspective of the tool of FIGS. 1 and 2, rotated to show the positions of the circumferential cutter blade and the longitudinal cutting hook blade.

FIG. 4 is a view in rear elevation of the tool of FIGS. 1-3, showing the relative positions of the circumferential and longitudinal cutters when the cutter head of the tool is in its closed position.

FIG. 5 is a view in left side elevation of the closed tool of FIGS. 1-4.

DESCRIPTION OF THE PREFERRED EMBODIMENT(S)

Figure 6:
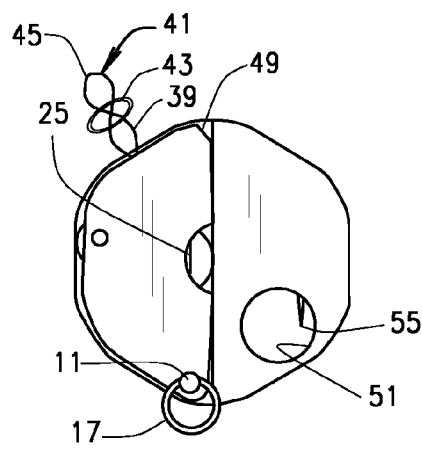
FIG. 6 is a view in front elevation of the closed tool of FIGS. 1-5.
Figure 7:
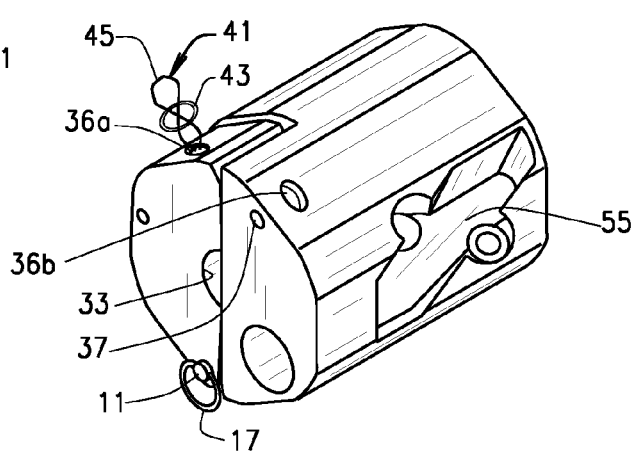
FIG. 7 is a view in front perspective of the closed tool of FIGS. 1-6.
Figure 8:
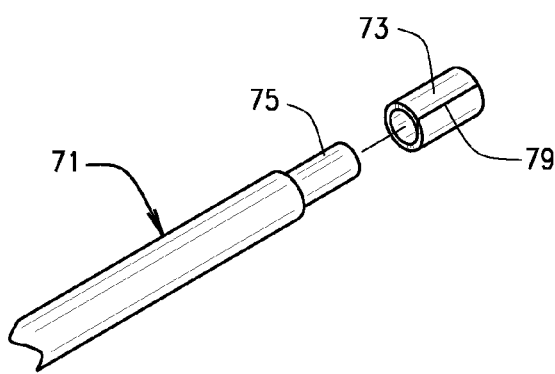
FIG. 8 is a view in perspective of a piece of metal tubing having a portion of a thermoplastic jacket removed by a tool of the invention.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Referring now to the Figures and in particular FIGS. 1-7, an illustrative tool 1 of the present invention includes a body 3 illustratively in the general form of a cylinder or polygonal-prism having a central axis 5. The forward end of the tool is split longitudinally, leaving an opening 7 for a cut head 9. The cut head 9 is pivotably held to the body 3 by a pin 11 having a distal head 13 captured in a pocket in the body 3, and a proximal end extending through the cut head 9. A cross-hole 15 near the proximal end of the pin 11 accommodates a split ring 17 which acts as a circle cotter to hold the pin 11 in place and also acts as a convenient place to clip the tool to the user's clothing or person to prevent the user from dropping the tool. Because the tool may frequently be used at a considerable height off the ground and around crowded piping arrays, the ability to clip it easily to the user, as by a carabiner on a lanyard, is valuable.

The body 3 is provided with a first longitudinal through-hole 21 extending from the rear of the tool into the opening 7, tangent to an anvil face 22 of the opening 7. The first longitudinal through-hole 21 is sized to accommodate a jacketed tube having a range of sizes. In this illustrative embodiment, the through hole 21 has a diameter of about 0.6" to accommodate 0.25" to 0.5" jacketed tubes.

The cut head 9 is provided with a recess 23 in its rearward face in which is positioned a first blade 25. The blade 25 is held in place by the head 27 of a bolt extending into a threaded hole 29 in the cut head. The bolt head 27 sits in a recess 28 in the margin of the rear face of the cutting head. A sharpened cutting edge 30 of the blade 25 is positioned a short distance d from the uppermost surface 31 of a longitudinally extending depression 33 aligned with the first through-hole 21. The depression 33 is made large enough to accommodate any size tube that will fit the through hole 21 and is preferably formed as an arc of a circle having a diameter no smaller than that of the through hole 21. As will be seen, this geometry ensures that the uppermost surface 31 will contact the jacket of a tube being cut by the cut head 9 and establish a maximum depth of cut equal to d. In the illustrative embodiment, the edge of the blade 25 extends about 0.03" below the uppermost surface 31. This depth is chosen to be slightly less than the thickness of a jacket on a tube to be cut by the tool 1, and may typically be between 0.25" and about 0.35" for common jacket thicknesses. The blade 25 may be a common box-cutter blade, such as a Stanley 11-987 (Stanley Black & Decker, New Britain, Conn. 06053).

The cut head 9 is urged toward the anvil face 22 by a coil tension spring 35 which extends through an opening 36a in the cut head 9 and an opening 36b in the body 3. The spring 35 is held at one end by a pin 37 through the body 3 and at the other end by one loop 39 of a figure-eight wire 41. The figure-eight wire 41 is held to the cut head 9 by a second circle cotter 43 which extends through both the first loop 39 and a second loop 45 of the figure-eight wire 41. When the cut head 9 is opened, the spring 35 is tensioned and urges the cut head closed again with sufficient force for the first blade 25 to cut through a polymer jacket on a tube or cable.

When it is desired to change the first blade 25, the second circle cotter 43 is twisted off of the second, inner, loop 45 of the figure-eight wire 41, thereby allowing the wire to slide through the opening in the cut head as the cut head is opened. Therefore, the tension in spring 35 is relieved, and the blade may be changed easily by loosening the bolt 27 without holding the cut head 9 open against the force of the spring. The bolt 27 is then tightened, the spring 35 pulled back through the cut head 9, and the circle cotter 43 is reattached to the second wire loop 45.

A cut-out 49 at the free end of the cut head 9 creates a finger-hold and permits easy pivotal opening of the cut head.

The body 7 also includes a second, outer, through-hole 51. The outer through-hole 51 is slightly larger than the first through-hole 21, having an illustrative diameter of about 0.7". A second recess 53 in the exterior of the body 3 intersects the second through-hole 51. The recess 53 is so oriented that a second blade 55 mounted in it is at a non-radial angle with respect to the through-hole, and spaced a short distance from the outer wall of the through-hole 51. The second blade 55 is a hook blade, such as a Stanley 11-961 (Stanley Black & Decker, New Britain, Conn. 06053). The hook blade 55 is held in place by washers 57 on bolts 59 threaded into the body 3. As is well known in the art, the hook blade includes hook parts at each end, each hook part having a sharpened edge 61. Illustratively the blade 55 extends into the through hole 51 approximately 0.2" parallel to a line defining the anvil 22, and the tip of the blade hook is spaced about 0.1" from the wall of the through hole 51.

Changing or reversing the hook blade 55 merely requires loosening the bolts 59, turning over or replacing the blade, and tightening the bolts 59.

It will be seen that the tool 1 is compact, easy to handle, and easy to maintain. It may be made of metal or plastic. It preferably has a diameter of about two to three inches and a depth of about 1.5 to about 3 inches.

The use of the illustrative tool 1 to remove a jacket from ¼" to ½ inch tubing or cable is now described. Typically, the tubing or cable is made of metal and the jacket is a flexible thermoplastic material. The jacket is typically 0.040" thick.

Figure 9A:
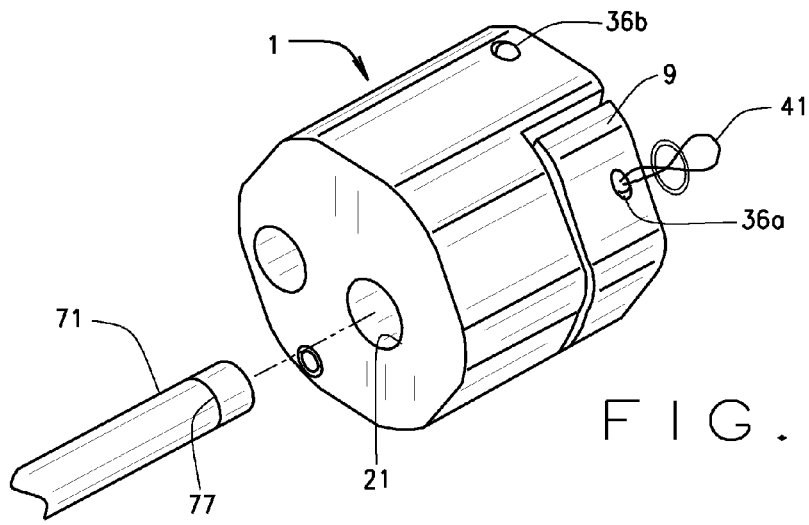
FIGS. 9A-9G show the use of the tool of FIGS. 1-7 in removing a jacket from a length of tubing, FIGS. 9D and 9E being partially cut away.
Figure 9B:
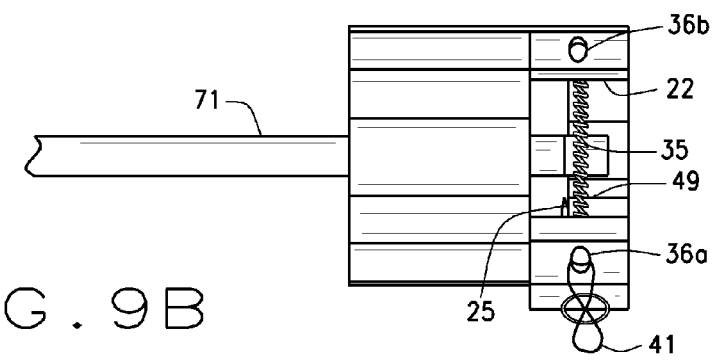

Referring now to FIGS. 8 and 9A-9G, illustrative metal tubing 75 has a flexible thermoplastic jacket 71, a small portion 73 of which is removed by the tool 1 in accordance with the present invention. The jacket 71 is marked to indicate a desired cut, as shown at 77 in FIG. 9A, then inserted into the guide hole 21 while the circumferential cutter head 9 is lifted so that the end of the tubing or cable is resting on the anvil 22. The circumferential cutter assembly is capable of self-adjusting for varying diameters of tubing or cable. The guide hole 21 and anvil 22 stabilize the tool while it is rotated around the circumference of the tube or cable causing the cutting blade 25 to track in a single path along the circumference of the jacketed tube or cable creating a joined score or cut in the outer jacket 73 without scratching or damaging the surface of the tube or cable 75 (FIG. 9B).

The cutting blade 25 is held in contact on the jacket of the tube or cable by the internal spring or other device or by manual compression of the adjustable cutter head. The adjustable cutter head and blade assembly is held in place by pivot pin 11 that maintains the circumferential cutting blade in a generally perpendicular orientation relative to the jacket surface. Because the distance from the cutter blade's cutting edge to the uppermost surface 31 of the depression 33 is fixed at 0.03", the blade can cut no deeper into the jacket 73. This distance is less than the expected thickness of the jacket.

Upon completion of a number of full rotations the adjustable cutter blade 25 is manually retracted from the surface of the tube or cable by rotating the adjustable cutter head 9 on the pivot pin 11 allowing the jacketed tube or cable to be withdrawn.

Figure 9C:
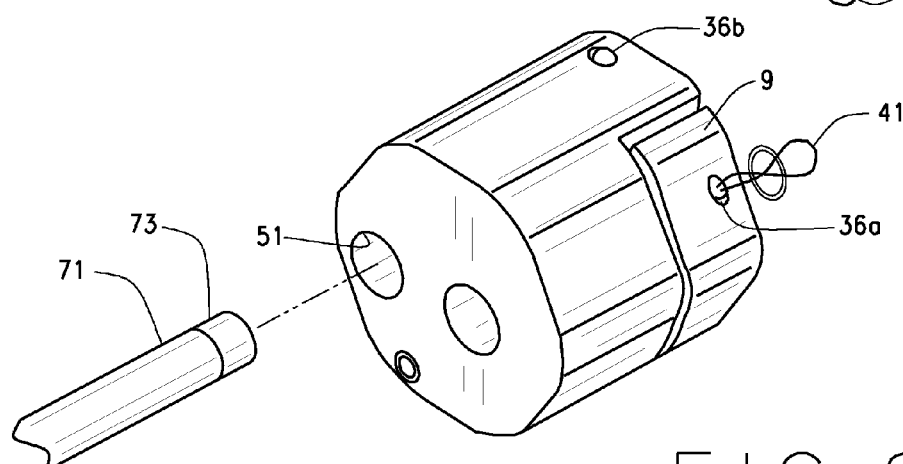
Figure 9D:
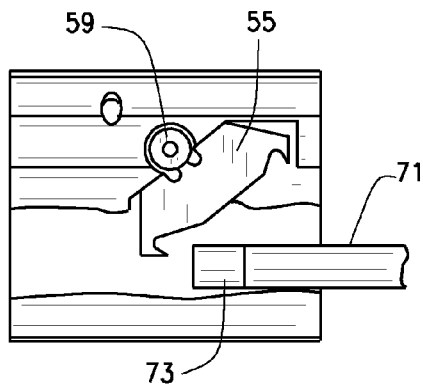
Figure 9E:
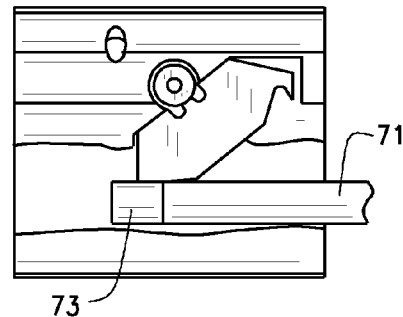

The end of the jacketed tube or cable is then inserted into the guide hole 51 comprising the longitudinal cutter of the tool (FIG. 9C). The tool is moved along the length of the tube or cable until the internal hook cutter can be inserted between the jacket and the tube or cable (FIG. 9D), at an angle generally tangent to the tubing 75. The tool is then pushed along the length of the jacketed tube or cable from the free end of the tube or cable in the direction of the circumferential cut or score. The internal hook cutter lifts the jacket away from the tube or cable and cuts it along the length of the tube or cable (FIG. 9E), making a cut 79 generally tangent to the tubing 75 (FIG. 9F), and thus not scratching or marring the tubing 75.

Figure 9F:
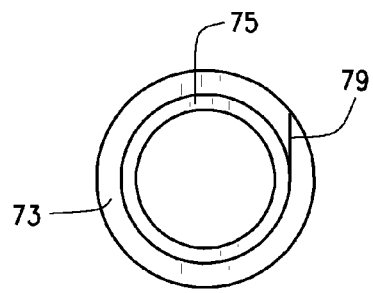
Figure 9G:
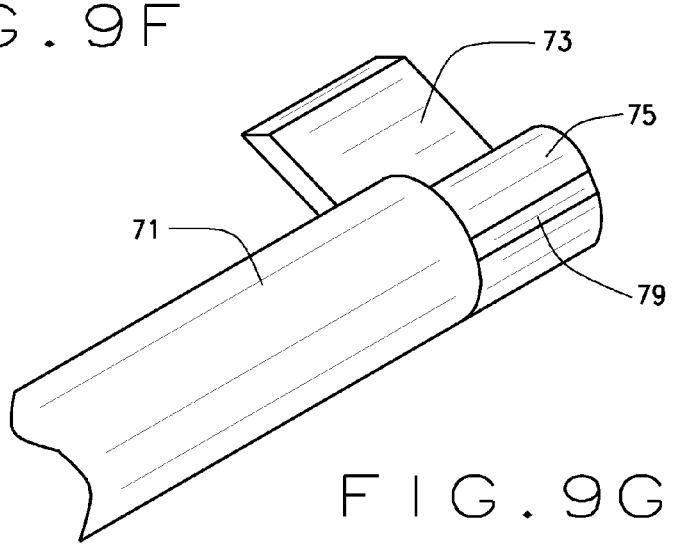

When the longitudinal internal hook cutter intersects with the circumferential cut or score, the tool is removed from the tube or cable. The jacket material is peeled from the tube or cable by grasping it along the longitudinal cut and pulling it in a circumferential path around the tube or cable (FIGS. 9F-9G).

Numerous variations in the device and method of the present invention will occur to those skilled in the art in view of the foregoing disclosure. Merely by way of example, the shape of the tool and the orientations of its openings may be changed. The tool may be formed of various metals or plastics and portions may be hollowed out to reduce weight. The figure-eight wire may be modified, replaced by another releasable hold for one end of the spring, or it may be eliminated and the spring secured at both ends. If the wire is eliminated, the bolt 27 may be accessed by removing circle cotter 17 and pulling the hinge pin 11. The blades may be held by other types of fasteners and the fastener or fasteners may be positioned differently. For example, the blade 25 may be held in an undercut in the wall or walls defining the recess 23. Other springs may be utilized, or the spring may be entirely eliminated. Different forms of cotters may be used in place of the split ring or rings. Rather than having an arcuate depression in the cut head adjacent the cutting blade, the blade may extend a short distance (less than the expected thickness of the jacket) beyond the cut head, and a stop provided on either the cut head or the anvil to prevent the blade from striking the anvil. This arrangement, however, makes shielding the user from the edge of the blade more difficult. These variations are merely illustrative.

The invention claimed is:

1. A tool for removing a jacket from a jacketed tube or cable, the jacketed tube or cable comprising a tube or cable and the jacket surrounding the tube or cable, the tool comprising a cutting blade having a sharp edge extending a predetermined short distance from a stop surface, the predetermined distance being no greater than the thickness of the jacket, and a hook blade extending into an opening in the tool, the hook blade being positioned to engage an inner surface of the jacket, the tool further comprising a first through-hole extending through a body portion of the tool tangent to an anvil portion of the tool and a cut head pivotably mounted to the body portion for reciprocation toward the anvil portion, the cut head including the stop surface, the stop surface being positioned to engage the jacket and restrain further movement of the cut head toward the tube or cable, the cutting blade being mounted a distance forward of the stop surface less than the expected thickness of the jacket.

2. The tool of claim 1 wherein the opening is a hole sized larger than the jacketed tube or cable, and wherein the hook blade is mounted in a recess in an outside surface of the tool, the hook blade extending into the hole at a non-radial orientation to the hole, the hook blade being positioned to engage the inner surface of the jacket at an angle substantially tangent to the tube or cable.

3. The tool of claim 1 wherein the opening is a second hole extending into the body portion and sized larger than the jacketed tube or cable, the hook blade extending into the second hole at a non-radial orientation to the hole, the hook blade being positioned to engage the inner surface of the jacket when the jacketed tube is inserted into the second hole.

4. The tool of claim 3 wherein the second hole is larger than the first through-hole.

5. The tool of claim 3 wherein the second hole extends through the body portion of the tool.

6. The tool of claim 3 wherein both blades are mounted in recesses.

7. The tool of claim 6 wherein both blades are mounted by bolts threaded into the tool.

8. The tool of claim 3 wherein the hook blade is mounted in a recess in an outside surface of the tool.

9. The tool of claim 3 wherein the cutting blade is mounted in a recess in the cut head.

10. The tool of claim 3 wherein the hook blade is mounted at an angle substantially tangent to the tube or cable when the tube or cable is positioned in the second hole.

11. The tool of claim 3 wherein the first through-hole and the second hole are circular.

12. The tool of claim 1 wherein the cut head is mounted to the body portion by a pin, an end of the pin including a through-hole, the tool further comprising a split ring mounted in the pin's through-hole.

13. The tool of claim 1 wherein the stop surface includes an upper surface of a depression in the cut head.

14. The tool of claim 13 wherein the depression comprises an arc of a circle, the circle having a radius at least as great as the radius of the first through-hole.

15. The tool of claim 1 wherein the opening in the tool positions the tube substantially tangent to a broad surface of the hook blade when the hook blade engages the inner surface of the jacket.

16. The tool of claim 1 wherein the cutting blade is mounted for movement in a plane perpendicular to a long axis of the first through hole.

* * * * *